United States Patent [19]

Scholnick et al.

[11] Patent Number: 5,175,959
[45] Date of Patent: Jan. 5, 1993

[54] NON TOXIC PROTECTIVE PERIMETER FOR SNAIL AND SLUG CONTROL

[76] Inventors: Michael K. Scholnick; Mildred C. Scholnick, both of 815 W. 30th St., San Pedro, Calif. 90721

[21] Appl. No.: 684,813

[22] Filed: Apr. 15, 1991

[51] Int. Cl.⁵ .............................................. A01M 1/00
[52] U.S. Cl. ....................................................... 43/124
[58] Field of Search ................. 43/124, 108, 121, 107; 428/461

[56] References Cited

U.S. PATENT DOCUMENTS

| | | | |
|---|---|---|---|
| 4,407,689 | 10/1983 | Ohtsuki | 428/461 |
| 4,471,562 | 9/1984 | Brucker | 43/108 |
| 4,477,513 | 10/1984 | Koga | 428/461 |
| 4,594,292 | 6/1986 | Nagai | 428/461 |
| 4,671,985 | 6/1987 | Rodrigues | 428/461 |
| 4,875,649 | 10/1989 | Bendig | 248/153 |

Primary Examiner—Kurt C. Rowan
Attorney, Agent, or Firm—John E. Halamka

[57] ABSTRACT

A snail and slug control apparatus formed as a composite sheet fabricated from a layer of polythene (polyeethylene) coated at least on one side with copper foil. An adhesive layer may be applied between the layer of polythene and the copper foil. The apparatus may be fabricated into a composite sheet by inserting the layers between nip rollers and cut to a preselected width. A length of the apparatus may be shaped to form a protective perimeter around selected areas. The apparatus may be held in place with stakes.

2 Claims, 1 Drawing Sheet

Fig. 1.
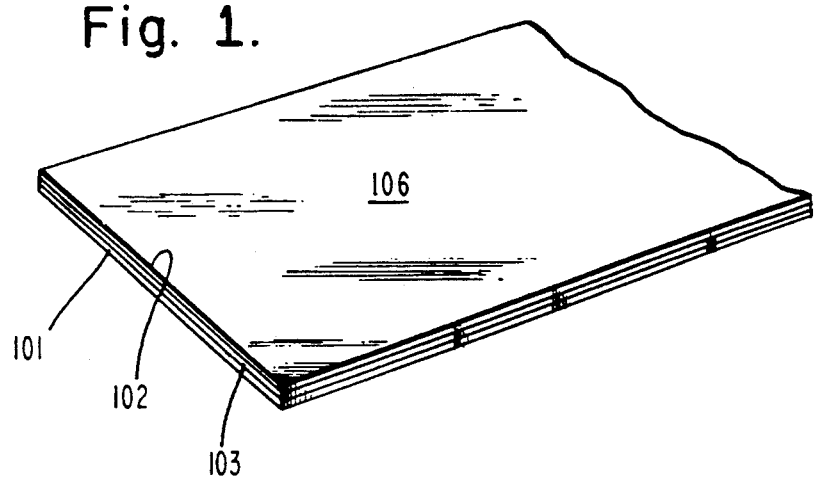
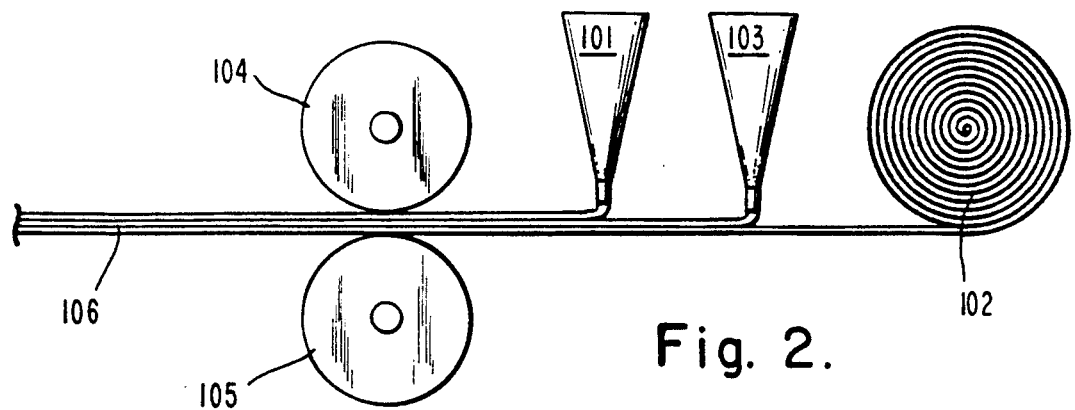
Fig. 2.
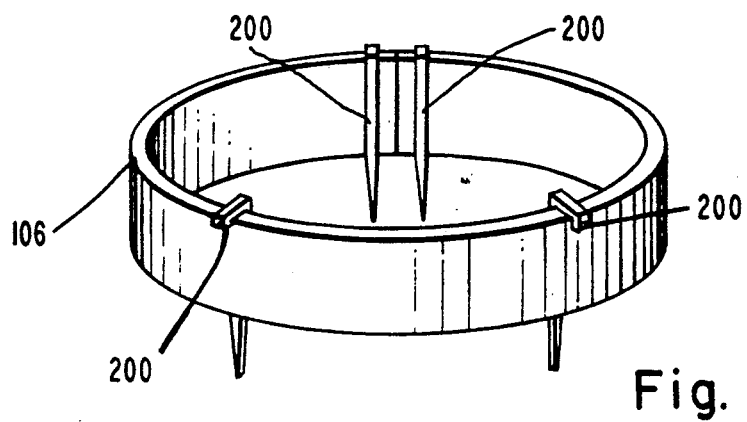
Fig. 3.

NON TOXIC PROTECTIVE PERIMETER FOR SNAIL AND SLUG CONTROL

BACKGROUND OF THE INVENTION

1. Field of the Invention

This invention relates to the art of pest control, and, more particularly, to an improved apparatus which may be used to establish a protective perimeter around a garden plot, a tree, a bush or other greenery to dissuade snails and slugs from crossing the perimeter and damaging the plants. The apparatus functions without the use of any pesticides or toxic material.

2. Description of the Prior Art

Non-toxic home remedies used in hopes of controlling snails and slugs have been used for many years.

One solution is to place cups of beer within the garden area. The user must first dig a hole for a suitable container to bury the container up to the rim. The beer is then poured into the container. The odor of the beer attracts the snails and slugs. They craw over the edge, fall in, and drown. This solution requires cleaning and refreshing the containers.

Some solutions have provided specialized containers in which the beer or other attractant lasts more than a day or two and which provides a disposable or at least easily cleaned catch basin to deal with the messy job of clean up of the catch.

The main disadvantage of these solutions is that the snails and slugs must craw through the garden before getting to the beer and they generally stop for a bit of tender plants on the way.

Still other solutions utilize poison bait to attract and disable the snails and slugs. This bait has the unfortunate effect of contaminating the soil and some are not recommended for use in a vegetable garden.

Other poisons are claimed to be usable in a vegetable garden as long as not used within a few days of harvest.

The use of any toxic substance within a yard poses risks for the user. Unattended children and pets are set at risk of ingesting the bait and becoming ill.

There is a product which produces a line of substance which is toxic to snails and which is difficult for children and pets to ingest. However, it is washed away by rain and sprinkler water. The diluted product then soaks into the ground with a resultant contamination to the soil or aquifer. As the frequency of rain and sprinkler attrition increases, the need to replace the product increases resulting in further accumulation of the toxins in the soil and/or ground water.

Thus there has long been a need for an apparatus to discourage the intrusion of snails and slugs into sensitive areas.

It is desired that this apparatus be passive so as not to require maintenance or refills.

It is desired that this apparatus not be toxic to children and pets.

It is desired that this apparatus be simple to install and perform its function for many months or even years before replacement is required.

It is desired that this apparatus be inexpensive and easily to manufacture.

It is further desired that this apparatus be simple to install and to withstand normal yard wear and tear after installation.

SUMMARY OF THE INVENTION

Accordingly, it is an object of the present invention to provide an improved snail and slug repellent apparatus.

It is another object to provide an apparatus which is easy to install, does not require periodic refilling, cleaning, re-installment or replacement on a short term basis such as weekly or monthly.

It is yet another object of the present invention to provide an apparatus which can be used as a "benderboard" boarder to be placed around and protect beds of flowers, vegetables or young trees (particularly citrus) from snails and slugs.

It is yet another object to provide a dam to contain water around plants, preventing run-off and thus optimizing water conservation.

It is yet another object to provide an apparatus which is rigid enough to withstand weather and visually attractive to act as a frame for those prize garden beds in the yard.

It is yet another object that the apparatus not be toxic to children or pets or build up in the environment to levels which would be toxic to the plants or to humans which harvest the plants protected by the apparatus.

The above and other objects of the present invention are achieved, according to a preferred embodiment thereof, by providing an improved apparatus consisting of a sheet of polythene (polyethylene) with a thin layer of copper applied to at least one side of the sheet. The sheet is of a preselected width which is easily installed to form a perimeter around a garden or tree. Pegs which engage one edge of the sheet and extend a preselected distance beyond the other edge are provided to assist in installing the sheet material in a user selected configuration.

In the preferred embodiment, the layer of copper, applied to one side of the sheet, acts as a natural, non-toxic deterrent to snails and slugs. If a snail or slug comes into contact with the copper, or copper oxide, it is believed that the slim generated by the snail or slug as they crawl over the apparatus has an acid content and reacts with the copper to form an oxide which is toxic to the snail or slug.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which:

FIG. 1 is a perspective view of the preferred apparatus;

FIG. 2 is a schematic of the fabrication of the preferred apparatus; and,

FIG. 3 is a perspective view of the preferred apparatus installed as a circle.

DESCRIPTION OF A PREFERRED EMBODIMENT

Referring now to the drawing, FIG. 1 shows the snail and slug control apparatus 10 according to the invention.

In the preferred embodiment, the apparatus 10 is fabricated as a sheet of plastic material 101 having a preselected polythene base and coated with a thin film of copper foil 102. The fabrication process may consist of applying, under pressure, a layer of bulk plastic beads to a roll of copper foil 102 having a layer of adhesive 103 on the side to which the beads are applied.

The plastic 101 is selected to be rigid, with very low cold flow. However when formed into a sheet, the plastic 101 must be flexible enough to be bent into general geometric shapes such as a circle with a radius as small as one foot. These properties may be attained by preselecting the appropriate filler, plasticizer, or stabilizer.

The copper foil 102 used in the preferred embodiment is a 58 inch wide roll of one ounce foil which is 0.01 mil thick. To aid adhesion, the copper foil 102 may be coated on one side with an additional layer of copper in "rough-up" configuration. A thin layer of zinc, in non-soluble form, may be applied to this "rough-up" configuration to form brass to strengthen the foil 102. The copper foil 102 forms a base to which on extruded polyethylene sheet is formed.

In the preferred embodiment, the arrangement of copper coated sheet 102 and plastic sheet 101 is fabricated by extruding pellets of high density polyethylene, an adhesive 103 and the copper foil 102 into a sheet formed to be at least 40 mil thick.

The layer of adhesive 103 bonds the copper foil 102 to the polyethylene sheet 101 formed from the beads. The adhesive 103 in the preferred embodiment is a blend of PRIMACORE adhesive polymer number 3150 and number 3160 blended at 3.5% and 5.0% respectively, with DOW Chemical Linear Low Density Polyethylene (L.L.D.P.E.)

Referring to FIG. 2, during the process of fabrication for the preferred embodiment, the layer of adhesive 103 is applied to one side of the copper foil 102. The layer of polyethylene pellets 101 heated to a temperature of 580 degrees is deposited onto the adhesive. The three layers are then pressed between a chill roller 104 and an opposing nip roller 105 to form a composite sheet 106.

It may be possible to deposit a mixture of copper pellets and polyethylene pellets onto a carrier, add adhesive and roll the mixture to form a composite sheet with copper pellets exposed on the outside surfaces of the composite sheet. The snails and slugs may come into contact with the individual pellets of copper with the same toxic effect.

The fabricated sheet may then be cut into preselected widths. Common BENDERBOARD is 3¼ inch wide. However, the apparatus fabricated by the present invention can be constructed in preselected colors, widths, thickness and shapes to give the user a wide variety of aesthetic pleasing boarders for each location.

A preselected pigment may be added to make the apparatus blend into the garden color scheme. The preferred embodiment is a dark brown in color. The copper foil will develop a patina which is generally a lighter brown and variegated to better camouflage and aid in blending the apparatus into the background of usual perception.

An ultra violet inhibitor may be added in the fabrication process to give longer life to the plastic as it may be subjected to intense sun exposure which degrades some plastic materials such as PVC. In the preferred embodiment, a ultra violet inhibitor is blended into the high density polyethylene.

A similar process used in the fabrication of integrated circuit boards may be used to produce a sheet of polythene coated on one or both sides with copper. However, the PC boards presently available are rigid and cannot be bent into a curve to conform to a closed area.

FIG. 3 illustrates how the preferred embodiment 10 is formed into a circle and held in place with the SNAIL NAILS 200 supplied with the product. The SNAIL NAILS 200 are formed as stakes which extend beyond the width of the composite sheet 106, each SNAIL NAIL 200 having a pointed end removably insertable into the ground and an opposite end formed with a notch which slides over the edge of the composite sheet 106. The SNAIL NAILS 200 may be unitarily fabricated of polythene with a UV inhibitor blended into the mixture before forming the device.

The apparatus may be applied as a collar around the trunk of a tree to prevent snails and slugs from climbing into the foliage of the tree.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. An apparatus to form a protective border against snails and slugs comprising in combination:
   a copper foil of preselected thickness having a selected first side;
   a layer of copper in rough-up configuration applied to said first side;
   a thin layer of non-soluble zinc applied to said rough-up copper;
   an adhesive layer applied to said first side of said copper foil; and
   a sheet of a preselected polythene material applied to said adhesive to form a flexible laminate and fabricated by pressing said layers and sheet between a chill roller and a nip roller to form a composite sheet of preselected thickness.

2. An apparatus to form a protective border against snails and slugs comprising in combination:
   a copper foil of preselected thickness having a selected first side;
   a layer of copper in rough-up configuration applied to said first side;
   a thin layer of non-soluble zinc applied to said rough-up copper;
   an adhesive layer applied to said first side of said copper foil; and
   a layer of polythene beads applied to said layer of adhesive on said copper foil and fabricated by pressing said layers and sheet between a chill roller and a nip roller to form a composite sheet of preselected thickness.

* * * * *